US010473971B2

United States Patent
Lee et al.

(10) Patent No.: US 10,473,971 B2
(45) Date of Patent: Nov. 12, 2019

(54) COLOR CONVERSION PANEL AND MANUFACTURING METHOD THEREOF, AND DISPLAY DEVICE INCLUDING THE SAME

(71) Applicant: Samsung Display Co., Ltd., Yongin-si (KR)

(72) Inventors: Seon Uk Lee, Seongnam-si (KR); Sung Man Kim, Seoul (KR); Han Jun Yu, Seoul (KR); Seong Su Lim, Seoul (KR); Kyung Tae Chae, Hwaseong-si (KR); Tae Hyung Hwang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 15/492,562

(22) Filed: Apr. 20, 2017

(65) Prior Publication Data

US 2018/0101056 A1  Apr. 12, 2018

(30) Foreign Application Priority Data

Oct. 7, 2016  (KR) .......................... 10-2016-0129960

(51) Int. Cl.
*G02F 1/1335* (2006.01)
*G02F 1/1368* (2006.01)
*G02F 1/1333* (2006.01)

(52) U.S. Cl.
CPC ...... *G02F 1/133528* (2013.01); *G02F 1/1368* (2013.01); *G02F 1/133617* (2013.01); *G02F 1/133377* (2013.01); *G02F 1/133504* (2013.01); *G02F 1/133553* (2013.01); *G02F 1/133606* (2013.01); *G02F 2001/133548* (2013.01); *G02F 2001/133565* (2013.01); *G02F 2201/121* (2013.01); *G02F 2201/123* (2013.01); *G02F 2202/36* (2013.01); *G02F 2203/34* (2013.01)

(58) Field of Classification Search
CPC ......... G02F 1/133528; G02F 1/133553; G02F 1/133504; G02F 1/1368
See application file for complete search history.

(56) References Cited

U.S. PATENT DOCUMENTS

| 8,525,958 B2 | 9/2013 | Lee |
| 9,383,601 B2 | 7/2016 | Lee et al. |
| 2010/0079704 A1* | 4/2010 | Cho .................. G02F 1/133617 349/71 |
| 2010/0201909 A1* | 8/2010 | Jung ................. G02F 1/133528 349/61 |

(Continued)

FOREIGN PATENT DOCUMENTS

| KR | 10-2012-0026880 | 3/2012 |
| KR | 10-2013-0104862 | 9/2013 |
| KR | 10-2015-0109010 | 10/2015 |

*Primary Examiner* — Dung T Nguyen
(74) *Attorney, Agent, or Firm* — H.C. Park & Associates, PLC

(57) ABSTRACT

A color conversion display panel according to an exemplary embodiment includes a transmission layer disposed on a substrate, a color conversion layer disposed on the substrate and including at least one of a quantum dot and a phosphor, a wire grid pattern disposed on the color conversion layer and the transmission layer, and a reflection pattern connected to a part of the wire grid pattern and disposed between the color conversion layer and the transmission layer disposed adjacent to the color conversion layer.

15 Claims, 12 Drawing Sheets

(56) References Cited

U.S. PATENT DOCUMENTS

| | | |
|---|---|---|
| 2012/0062448 A1 | 1/2012 | Van Rompay |
| 2013/0242228 A1 | 9/2013 | Park et al. |
| 2014/0160408 A1* | 6/2014 | Cho .................. G02F 1/133617 349/110 |
| 2015/0131029 A1* | 5/2015 | Kaida ............... G02F 1/133617 349/69 |
| 2015/0268491 A1 | 9/2015 | Kwon et al. |
| 2018/0231843 A1* | 8/2018 | Park .................. G02F 1/133617 |
| 2018/0269362 A1* | 9/2018 | Lee ....................... H01L 33/502 |

* cited by examiner

COLOR CONVERSION PANEL AND MANUFACTURING METHOD THEREOF, AND DISPLAY DEVICE INCLUDING THE SAME

CROSS-REFERENCE TO RELATED APPLICATION

This application claims priority from and the benefit of Korean Patent Application No. 10-2016-0129960, filed on Oct. 7, 2016, which is hereby incorporated by reference for all purposes as if fully set forth herein.

BACKGROUND

Field

Exemplary embodiments relate to a color conversion display panel, a manufacturing method thereof, and a display device including the same.

Discussion of the Background

One of the most widely used display device is a liquid crystal display, which has a structure in which field generating electrodes are provided in each of two display panels. A plurality of thin film transistors and pixel electrodes are arranged in a matrix form in one display panel, color filters of red, green, and blue are disposed in the other display panel, and a common electrode covers the entire surface thereof.

However, in a liquid crystal display, light loss occurs in a polarization layer and the color filter.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a color conversion display panel in which upper surfaces of a plurality of color conversion layers include a wire grid pattern and a transmission layer to improve light loss and increase light emission efficiency, a manufacturing method thereof, and a display device including the same.

Exemplary embodiments provide a color conversion display panel including a reflection pattern connected to the wire grid pattern, a manufacturing method thereof, and a display device including the same.

Exemplary embodiments provide a color conversion display panel simplifying a manufacturing process by forming a transmission layer using a sacrificial pattern, a manufacturing method thereof, and a display device including the same.

Additional aspects will be set forth in the detailed description which follows, and, in part, will be apparent from the disclosure, or may be learned by practice of the inventive concept.

According to exemplary embodiments, a color conversion display panel includes a transmission layer disposed on a substrate, a color conversion layer disposed on the substrate and including at least one of a quantum dot and a phosphor, a wire grid pattern disposed on the color conversion layer and the transmission layer, and a reflection pattern connected to a part of the wire grid pattern and disposed between the color conversion layer and the transmission layer disposed adjacent to the color conversion layer.

According to exemplary embodiments, a display device includes a lower panel, a color conversion display panel overlapping the lower panel, and a liquid crystal layer disposed between the lower panel and the color conversion display panel. The color conversion display panel includes a substrate overlapping the lower panel, a color conversion layer and a transmission layer positioned between the substrate and the liquid crystal layer, a wire grid pattern disposed between the color conversion layer and the liquid crystal layer, and disposed between the transmission layer and the liquid crystal layer, and a reflection pattern connected to a part of the wire grid pattern.

According to exemplary embodiments, a display device includes a display panel and a color conversion display panel overlapping the display panel, wherein the color conversion display panel includes a substrate overlapping the display panel, a color conversion layer and a transmission layer disposed between the substrate and the display panel, a wire grid pattern disposed between the color conversion layer and the display panel and disposed between the transmission layer and the display panel, and a reflection pattern connected to a part of the wire grid pattern.

According to exemplary embodiments, a manufacturing method for a color conversion display panel includes disposing first, second, and third sacrificial patterns on a substrate, disposing a passivation material layer on the first, second, and third sacrificial patterns, removing a part of the passivation material layer to expose the first and second sacrificial patterns and to form a first passivation layer, removing the exposed first and second sacrificial patterns to form first and second microcavities, disposing a first resin material including a red quantum dot into the first microcavity to form a red color conversion layer, and disposing a second resin material including a green quantum dot into the second microcavity to form a green color conversion layer, wherein the third sacrificial pattern is a transmission layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
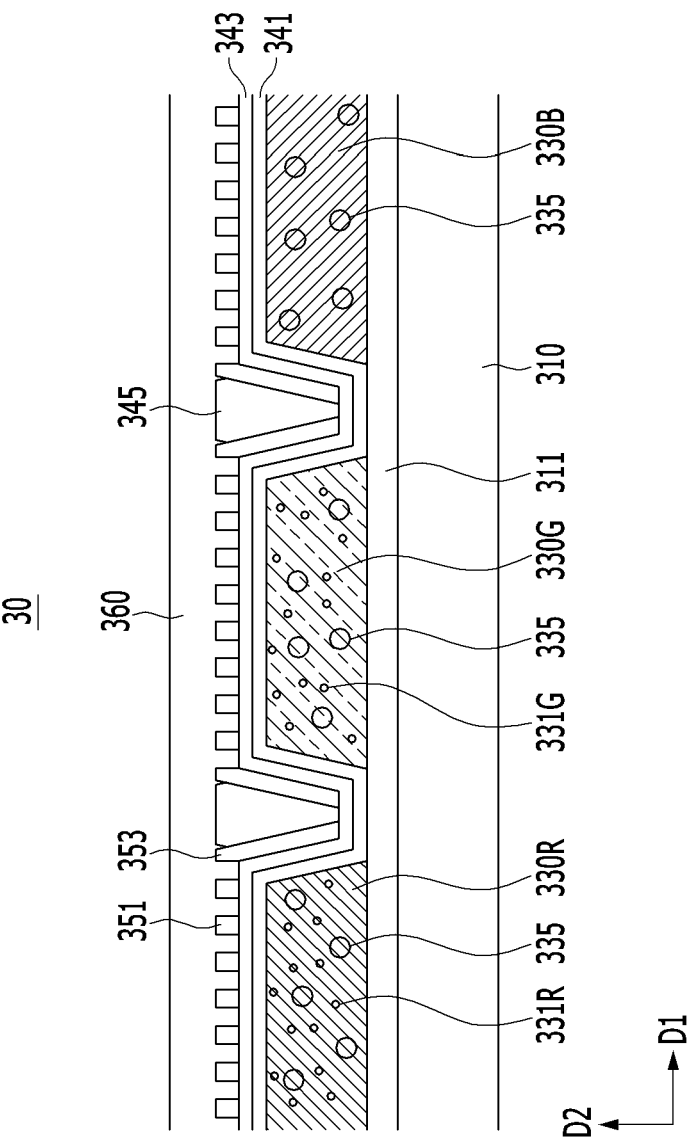
FIG. 1 is a cross-sectional view of a color conversion display panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z n addition, unless explicitly described to the contrary, the word "comprise" based on a g and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A color conversion display panel according to an exemplary embodiment of the present invention will be described with reference to FIG. 1. FIG. 1 is a cross-sectional view of a color conversion display panel according to an exemplary embodiment.

A color conversion display panel 30 according to an exemplary embodiment includes a first passivation layer 311 positioned on a substrate 310.

The present specification describes an exemplary embodiment in which the first passivation layer 311 is positioned at an entire surface of the substrate 310, however it is not limited thereto.

For example, the first passivation layer 311 may be a blue light cutting filter. When the first passivation layer 311 is the blue light cutting filter, the first passivation layer 311 may overlap a red color conversion layer 330R and a green color conversion layer 330G, and may not overlap a transmission layer 330B.

The first passivation layer 311 of the blue light cutting filter may block or absorb blue light supplied from a light assembly (not shown). The blue light incident to the red color conversion layer 330R and the green color conversion layer 330G from the light assembly (not shown) may be emitted as red or green light by a phosphor or a quantum dot. In this case, some blue light that is not changed into the red light or the green light may be emitted outside the color conversion layer. The first passivation layer 311 may absorb blue light emitted outside the color conversion layer, thereby preventing the emitted red light or green light and the blue light emitted by the light assembly from being mixed. When the red light or the green light is mixed with the blue light, color reproducibility may be decreased.

A plurality of color conversion layers 330R and 330G and a transmission layer 330B may be positioned on the first passivation layer 311. The plurality of color conversion layers 330R and 330G may emit the incident light as light of different colors. The transmission layer 330B may emit the incident light without a separate color conversion, and thus, the blue light may be emitted.

According to an exemplary embodiment, a distance from the upper surface of the red color conversion layer 330R, the green color conversion layer 330G, and the transmission layer 330B to the substrate 310 may be substantially the same. The upper surface of the red color conversion layer 330R, the green color conversion layer 330G, and the transmission layer 330B may have substantially the same height. The plurality of color conversion layers 330R and 330G and the transmission layer 330B may provide the flat upper surface to overlying constituent elements.

The red color conversion layer 330R may include at least one of a phosphor and a quantum dot 331R that converts incident blue light into red light. When the red color conversion layer 330R includes a red phosphor, the red phosphor may contain at least one of (Ca, Sr, Ba)S, (Ca, Sr, Ba)2Si5N8, CaAlSiN3, CaMoO4, and Eu2Si5N8, but it is not limited thereto. The red color conversion layer 330R may include at least one kind of red phosphor.

The green color conversion layer 330G may include at least one of a phosphor and a quantum dot 331G that converts incident blue light into green light. When the green color conversion layer 330G includes a green phosphor, the green phosphor may contain one of yttrium aluminum garnet (YAG), (Ca, Sr, Ba)2SiO4, SrGa2S4, BAM, α-SiAlON, β-SiAlON, Ca3Sc2Si3O12, Tb3Al5O12, BaSiO4, CaAlSiON, and (Sr1-xBax)Si2O2N2, but it is not limited thereto. The green color conversion layer 330G may include at least one kind of green phosphor. In this case, the x may be any number between 0 and 1.

The red color conversion layer 330R and the green color conversion layer 330G may include a quantum dot for converting color instead of the phosphor. In this case, the quantum dot may be selected from a Group II-VI compound, a Group III-V compound, a Group IV-VI compound, a Group IV element, a Group IV compound, and a combination thereof.

The Group II-VI compound may be selected from a two-element compound selected from CdSe, CdTe, ZnS, ZnSe, ZnTe, ZnO, HgS, HgSe, HgTe, MgSe, MgS, and a mixture thereof; a three-element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from a two-element compound selected from GaN, GaP, GaAs, GaSb, AN, AlP, AlAs, AlSb, InN, InP, InAs, InSb, and a mixture thereof; a three-element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a four-element compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof. The Group IV-VI compound may be selected from a two-element compound selected from SnS, SnSe, SnTe, PbS, PbSe, PbTe, and a mixture thereof; a three-element compound selected from SnSeS, SnSeTe, SnSTe, PbSeS, PbSeTe, PbSTe, SnPbS, SnPbSe, SnPbTe, and a mixture thereof; and a four-element compound selected from SnPbSSe, SnPbSeTe, SnPbSTe, and a mixture thereof. The Group IV element may be selected from Si, Ge, and a mixture thereof. The Group IV compound may be a two-element compound selected from SiC, SiGe, and a mixture thereof.

In this case, the two-element compound, the three-element compound, or the four-element compound may exist in particles with a uniform concentration, or in the same particle while being divided to have partially different concentration distributions. Alternatively, they may have a core and shell structure where one quantum dot encloses another quantum dot. An interface between the core and the shell may have a concentration gradient such that a concentration of an element existing in the shell gradually decreases closer to a center of the interface.

The transmission layer 330B may include a resin that transmits incident blue light. According to an exemplary embodiment the transmission layer 330B may be a transparent photosensitive resin, and more particularly, the transmission layer 330B may be a photosensitive resin of a negative type or a positive type. Also, although not shown in the present specification, the transmission layer 330B may further include a dye or a pigment.

At least one of the red color conversion layer 330R, the green color conversion layer 330G, and the transmission layer 330B may include a scattering member 335. For example, the red color conversion layer 330R, the green color conversion layer 330G, and the transmission layer 330B may respectively include the scattering member 335, or the transmission layer 330B may include the scattering member 335, while the red color conversion layer 330R and the green color conversion layer 330G may not include the scattering member.

The scattering member 335 may include any material that can evenly scatter incident light, and may include one of titanium dioxide ($TiO_2$), zirconium dioxide ($ZrO_2$), aluminum(III) oxide ($Al_2O_3$), indium(III) oxide ($In_2O_3$), zinc oxide (ZnO), tin dioxide ($SnO_2$), antimony(III) oxide ($Sb_2O_3$), and indium tin oxide (ITO).

A second passivation layer 341 and a third passivation layer 343 may be sequentially positioned on the red color conversion layer 330R, the green color conversion layer 330G, and the transmission layer 330B. The second passivation layer 341 and the third passivation layer 343 may respectively include an inorganic material or an organic material. The second passivation layer 341 and the third passivation layer 343 may include the same material or different materials.

The second passivation layer 341 may overlap the red color conversion layer 330R, the green color conversion layer 330G, and the transmission layer 330B.

The second passivation layer 341 may overlap the upper and at least four side surfaces of the red color conversion layer 330R, and may include an exposed region overlapping the red color conversion layer 330R.

Likewise, the second passivation layer 341 may overlap the upper and at least four side surfaces of the green color conversion layer 330G, and may include an exposed region overlapping the green color conversion layer 330G.

The second passivation layer 341 may overlap all of the upper surface and four sides surfaces of the transmission layer 330B. Five surfaces, except for a lower surface, of the transmission layer 330B may be completely enclosed by the second passivation layer 341.

That is, the second passivation layer 341 may include an exposed region (not shown) for injecting the resin material in the manufacturing process, and the exposed region may overlap the red color conversion layer 330R and the green color conversion layer 330G. The exposed region may not overlap the transmission layer 330B.

The third passivation layer 343 may be disposed on the second passivation layer 341 and may cover the entire surface of the substrate 310. The third passivation layer 343 may be positioned to cover the exposed region where the second passivation layer 341 partially exposes the red color conversion layer 330R and the green color conversion layer 330G. The third passivation layer 343 may completely cover the red color conversion layer 330R, the green color conversion layer 330G, and the transmission layer 330B.

A wire grid pattern 351 and a reflection pattern 353 may be positioned on the third passivation layer 343.

The wire grid pattern 351 may overlap the upper surface of the red color conversion layer 330R, the upper surface of the green color conversion layer 330G, and the upper surface of the transmission layer 330B. The wire grid pattern 351 may be a pattern for polarizing visible rays having a wavelength of about 400 nm to about 800 nm, and has a plane shape in which a pattern of a line shape having a width of about 100 nm to about 200 nm is periodically disposed at a predetermined interval. The wire grid pattern 351 may prevent reflection of external light.

The wire grid pattern 351 may include a metal. For example, the wire grid pattern 351 may include at least one of aluminum (Al), titanium (Ti), chromium (Cr), silver (Ag), gold (Au), nickel (Ni), and an alloy thereof.

The wire grid pattern 351 may not be positioned between the adjacent red color conversion layer 330R, green color conversion layer 330G, and transmission layer 330B. That is, the wire grid pattern 351 may only be positioned on the upper surface of the red color conversion layer 330R, the upper surface of the green color conversion layer 330G, and the upper surface of the transmission layer 330B. The wire grid pattern 351 and the red color conversion layer 330R, the green color conversion layer 330G, and the transmission layer 330B may not overlap each other in a plan view.

The reflection pattern 353 may be positioned between the adjacent red color conversion layer 330R, green color conversion layer 330G, and transmission layer 330B. The reflection pattern 353 may reflect the light, emitted to the side of the color conversion layers 330R and 330G and the side of the transmission layer 330B, toward the substrate 310. Light emission efficiency of the color conversion display panel 30 may thereby be increased.

The reflection pattern 353 may respectively overlap the side of the red color conversion layer 330R, the side of the green color conversion layer 330G, and the side of the transmission layer 330B. Also, the reflection pattern 353 may be separated between the adjacent red color conversion layer 330R, green color conversion layer 330G, and transmission layer 330B. As shown in FIG. 1, the reflection pattern 353 may overlap the side of the red color conversion layer 330R, the side of the green color conversion layer 330G, or the side of the transmission layer 330B, and the reflection pattern 353 overlapping the different color conversion layers 330R and 330G and the transmission layer 330B may not be connected to each other. When the adjacent reflection patterns 353 are connected to each other, the reflection pattern may reflect external light, and color reproducibility may be reduced.

Part of the wire grid pattern 351 may be connected to the reflection pattern 353. Referring to FIG. 1, the part of the wire grid pattern 351 positioned at the edge of the red color conversion layer 330R may be connected to the reflection pattern 353. This is the same for the wire grid pattern 351 that is respectively positioned at the edge of the green color conversion layer 330G and the edge of the transmission layer 330B. This is because the wire grid pattern 351 and the reflection pattern 353 are formed through the same process and from the same metal layer.

The light blocking member 345 may be positioned between the red color conversion layer 330R and the green color conversion layer 330G, between the green color conversion layer 330G and the transmission layer 330B, between the transmission layer 330B and the red color conversion layer 330R, and between the same layers 330R, 330G, and 330B. The light blocking member 345 may define regions where the red color conversion layer 330R, the green color conversion layer 330G, and the transmission layer 330B are disposed.

The light blocking member 345 may overlap the reflection pattern 353 positioned between the adjacent red color conversion layer 330R, green color conversion layer 330G, and transmission layer 330B. The upper surface of the light blocking member 345 may be positioned at substantially the same height as the upper surface of the wire grid pattern 351.

A fourth passivation layer 360 may be positioned on the wire grid pattern 351 and the light blocking member 345. The fourth passivation layer 360 may be silicon oxide, but it is not limited thereto. The fourth passivation layer 360 may flatten the upper surface of the color conversion display panel 30.

Next, a manufacturing method of the color conversion display panel according to an exemplary embodiment of the present invention will be described with reference to FIGS. 2 to 8. FIG. 2, FIG. 3, FIG. 4, FIG. 5, FIG. 6, FIG. 7, and FIG. 8 are cross-sectional views of a manufacturing method of a color conversion display panel according to an exemplary embodiment.

Figure 2:
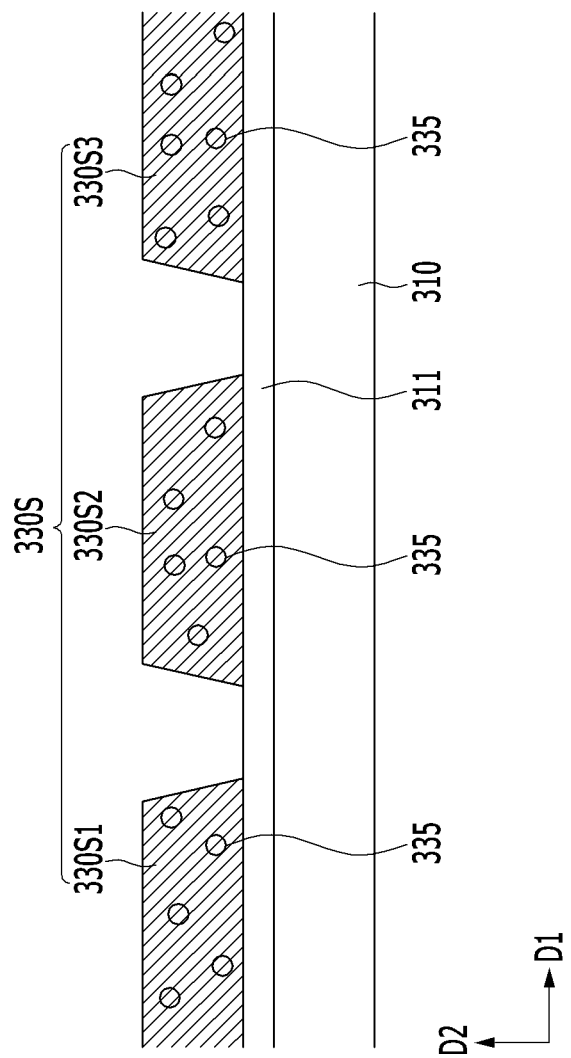
FIG. 2, FIG. 3, FIG. 4, FIG. 5, FIG. 6, FIG. 7, and FIG. 8 are cross-sectional views of a manufacturing method of a color conversion display panel according to an exemplary embodiment.

Referring to FIG. 2, a first passivation layer 311 and a plurality of sacrificial patterns 330S are formed on a substrate 310.

The first passivation layer 311 may be formed on the entire surface of the substrate 310, however it is not limited thereto, and the first passivation layer 311 may be omitted or may be formed to overlap part of the substrate 310.

The plurality of sacrificial patterns 330S may be formed by disposing a photosensitive organic material on the first passivation layer 311 and performing a photolithography process on the photosensitive organic material.

The plurality of sacrificial patterns 330S may include a first sacrificial pattern 330S1, a second sacrificial pattern 330S2, and a third sacrificial pattern 330S3. The first sacrificial pattern 330S1, the second sacrificial pattern 330S2, and the third sacrificial pattern 330S3 may be repeatedly disposed in a matrix form. The first sacrificial pattern 330S1, the second sacrificial pattern 330S2, and the third sacrificial pattern 330S3 may have any shape to form a later-described microcavity, and may be connected along a column of the plurality of pixels and may have a shape patterned in the matrix form.

The plurality of sacrificial patterns 330S may include one among transparent photosensitive resins of a negative type and a positive type, and may further include the scattering member 335 according to the present exemplary embodiment.

Figure 3:
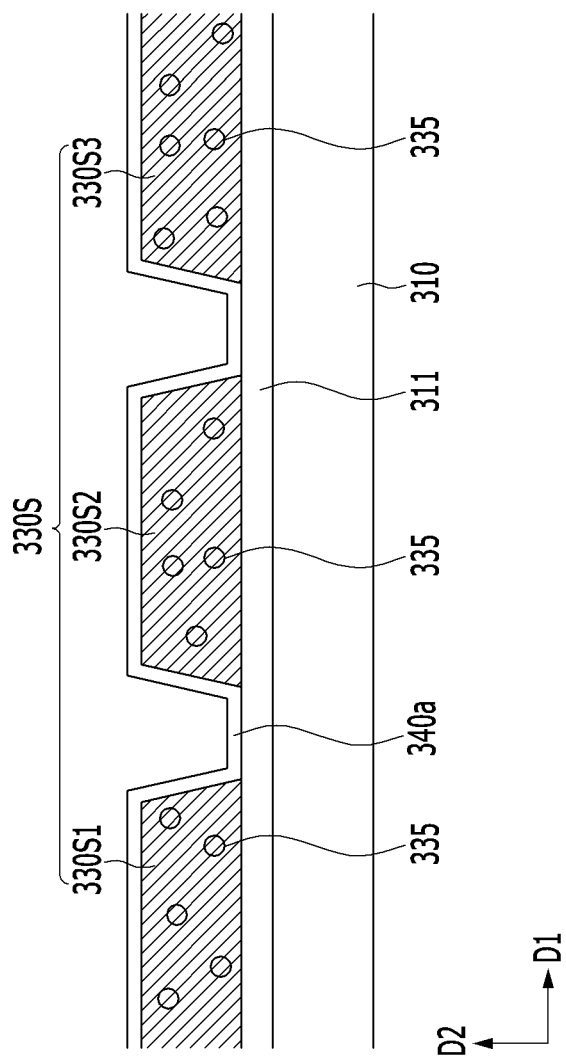

Referring to FIG. 3, a second passivation material layer 340a is formed on the entire surface of the plurality of sacrificial patterns 330S and the substrate 310. The second passivation material layer 340a may be an inorganic material layer or an organic material layer, or may be a layer in which the inorganic material and the organic material are deposited.

Figure 4:
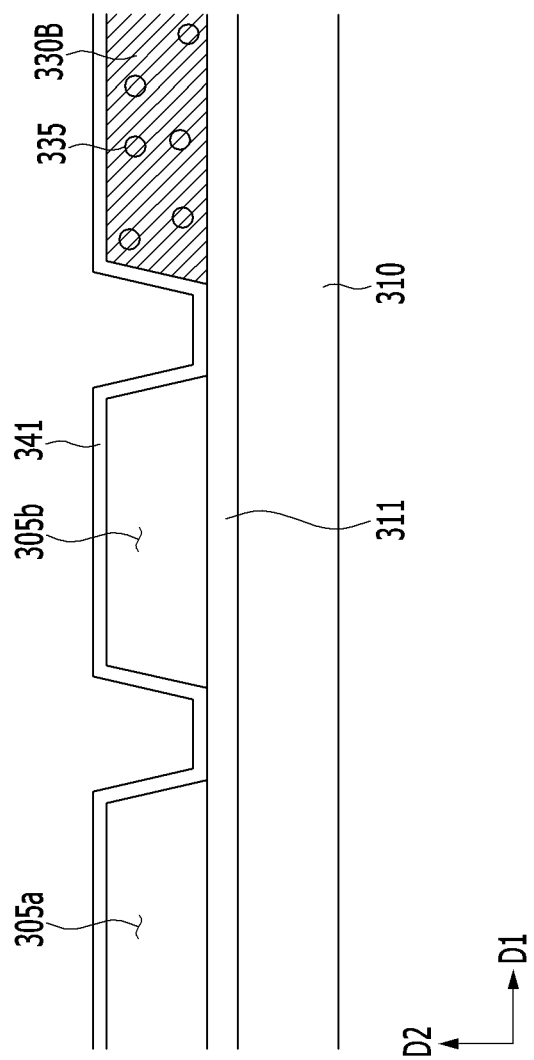

As shown in FIG. 4, the first sacrificial pattern and the second sacrificial pattern (referring to 330S1 and 330S2 of FIG. 3) are removed to form a first microcavity 305a and a second microcavity 305b, and the second passivation layer 341 positioned on the first microcavity 305a and the second microcavity 305b may be formed.

The second passivation layer 341 may expose part of the first sacrificial pattern 330S1 and the second sacrificial pattern 330S2, and not expose the third sacrificial pattern 330S3.

For example, the first sacrificial pattern (referring to 330S1 of FIG. 3) may be periodically exposed through the second passivation layer 341 at a trench, and the second sacrificial pattern (referring to 330S2 of FIG. 3) may be periodically exposed at a trench where the first sacrificial pattern is not exposed. A trench may be an area positioned between an n-th row and an (n+1)-th row of the plurality of sacrificial patterns arranged in a matrix form, may be positioned alternately as an even-numbered trench or an odd-numbered trench, and may be referred to as a separated space between the sacrificial patterns.

A developer or a stripper solution may be applied to the substrate 310 to remove the first sacrificial pattern 330S1 and the second sacrificial pattern 330S2 which are exposed by the second passivation layer 341, and the exposed first sacrificial pattern 330S1 and second sacrificial pattern 330S2 may be removed by using an ashing process. The first microcavity 305a and the second microcavity 305b may be formed at the removed region.

The third sacrificial pattern 330S3 may not be exposed by the second passivation layer 341 and removed. The third sacrificial pattern 330S3 may remain after the first microcavity 305a and the second microcavity 305b are formed.

Figure 5:
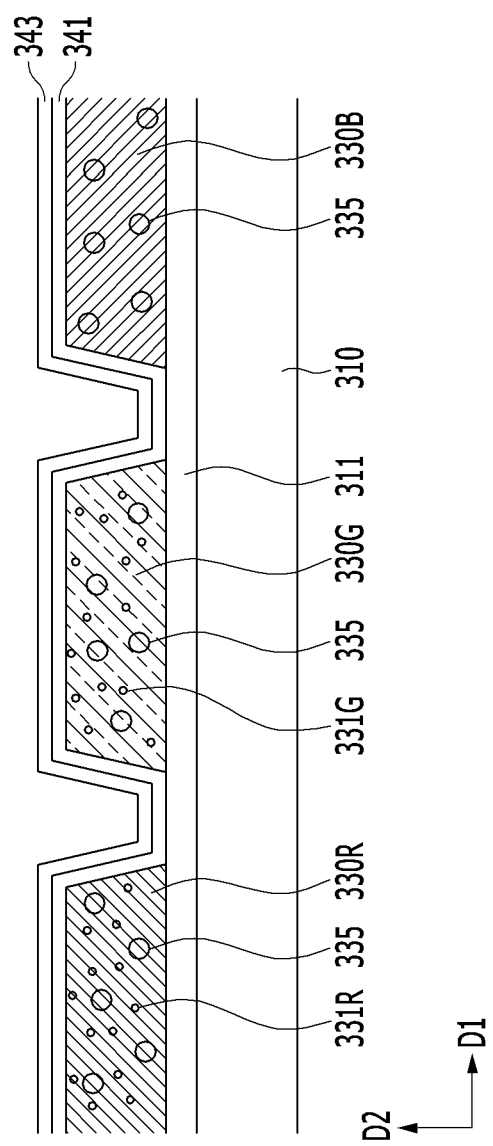

Referring to FIG. 5, a red color conversion layer 330R, a green color conversion layer 330G, and a transmission layer 330B are formed on the first passivation layer 311, and a third passivation layer 343 is formed on the second passivation layer 341.

The red color conversion layer 330R may be formed by injecting the first resin material including a red quantum dot into the first microcavity (referring to 305a of FIG. 4), and the green color conversion layer 330G may be formed by injecting the second resin material including a green quantum dot into the second microcavity (referring to 305b of FIG. 4).

The first resin material including the red quantum dot may be provided in the odd-numbered trench by an Inkjet method or a dispensing method, and the second resin material including the green quantum dot may be provided in the even-numbered trench by an Inkjet method or a dispensing method. When the resin material is disposed near the microcavities 305a and 305b exposed along the trench, the resin material including the quantum dot may be introduced into the microcavities 305a and 305b. Accordingly, resin material of different qualities may be separately injected into the first microcavity 305a and the second microcavity 305b which are positioned in the same row.

The transmission layer 330B may be formed by the third sacrificial pattern (referring to 330S3 of FIG. 4). The third sacrificial pattern 330S3 may not be exposed by the second passivation layer 341 and may not be removed like the first sacrificial pattern 330S1 and the second sacrificial pattern 330S2. The transmission layer 330B may be formed of the third sacrificial pattern 330S3 without a separate resin material, thereby simplifying the manufacturing process.

The resin material included in the third sacrificial pattern 330S3 may include the scattering member 335 so that the transmission layer 330B may also include the scattering member 335. The red color conversion layer 330R and the green color conversion layer 330G may also include the resin material including the scattering member 335.

The red color conversion layer 330R, the green color conversion layer 330G, and the transmission layer 330B may be formed by using the same sacrificial pattern 330S such that they may be formed to have the same height from the substrate 310. The distance from the substrate 310 to the upper surface of the red color conversion layer 330R, the green color conversion layer 330G, and the transmission layer 330B may be substantially the same. The upper surface of the red color conversion layer 330R, the green color conversion layer 330G, and the transmission layer 330B may provide a flat upper surface without a step. Accordingly, the constituent elements that are deposited thereon or formed thereon may be manufactured to be flat without a step and the failure generation may be reduced, thereby improving the reliability of the device.

The third passivation layer 343 may be formed to seal the first microcavity 305a and the second microcavity 305b through which the first resin material and the second resin material were injected so that the first microcavity 305a and the second microcavity 305b is not exposed. The third passivation layer 343 may be formed on the entire surface of the substrate 310.

Figure 6:
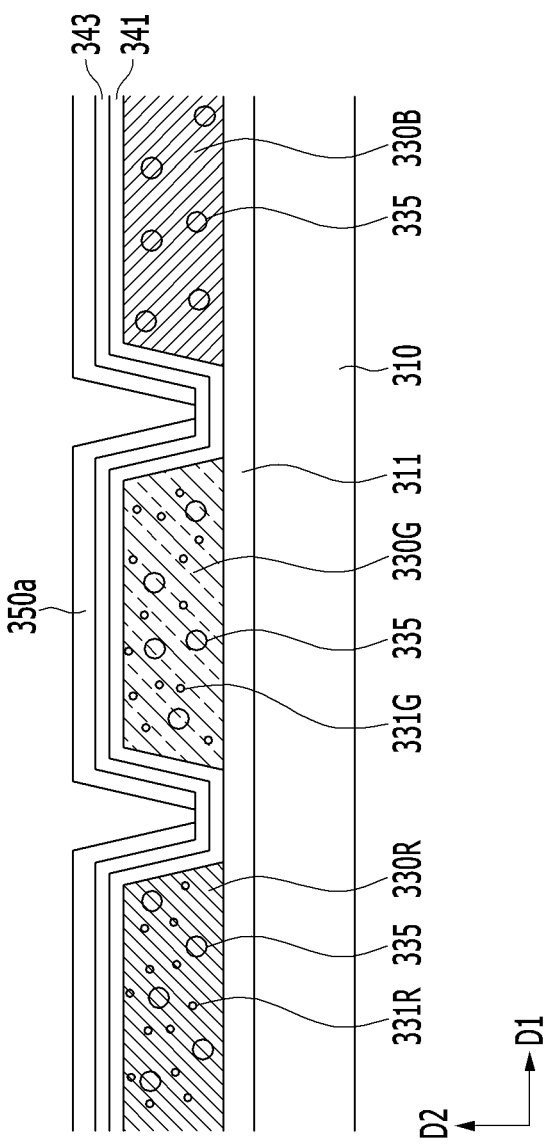

As shown in FIG. 6, a first metal pattern 350a is formed on the third passivation layer 343 by patterning.

The first metal pattern 350a may include a metal such as aluminum (Al), titanium (Ti), chromium (Cr), silver (Ag), gold (Au), nickel (Ni), or alloys thereof.

The first metal pattern 350a, as shown in FIG. 6, may overlap the upper surface and the side surfaces of the red color conversion layer 330R, the upper surface and the side surfaces of the green color conversion layer 330G, and the upper surface and the side surfaces of the transmission layer 330B. However, the first metal pattern 350a covering the red color conversion layer 330R may not be connected to the first metal pattern 350a which covers the green color conversion layer 330G or transmission layer 330B Likewise, the first metal pattern 350a covering the green color conversion layer 330G may not be connected to the first metal pattern 350a which covers the transmission layer 330B.

Figure 7:
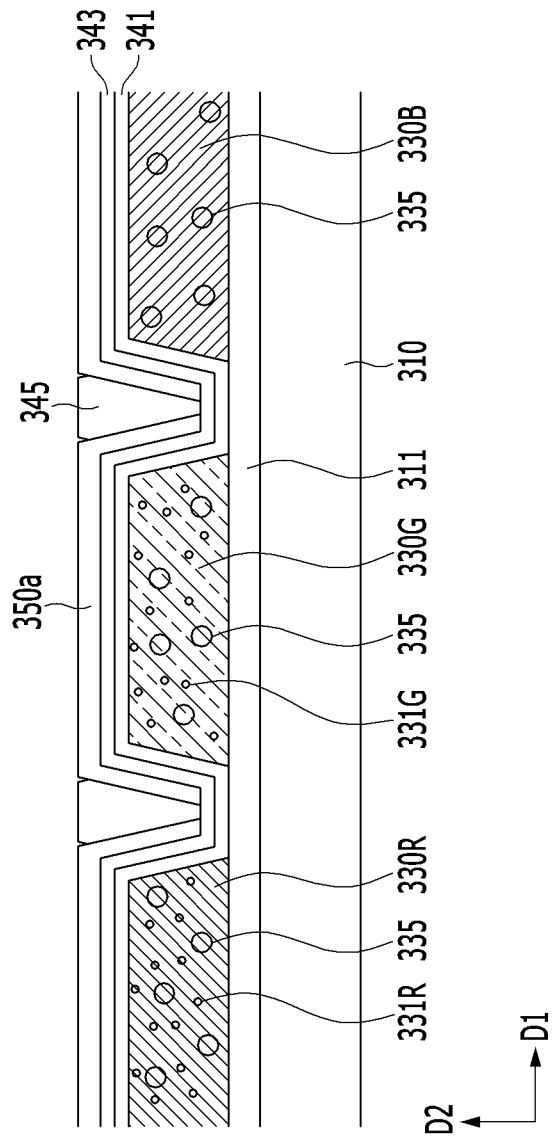

As shown in FIG. 7, a light blocking material is disposed to form a light blocking member 345 between the adjacent red color conversion layer 330R, green color conversion layer 330G, and transmission layer 330B. The upper surface of the light blocking member 345 may be substantially the same height as the upper surface of the first metal pattern 350a.

Figure 8:
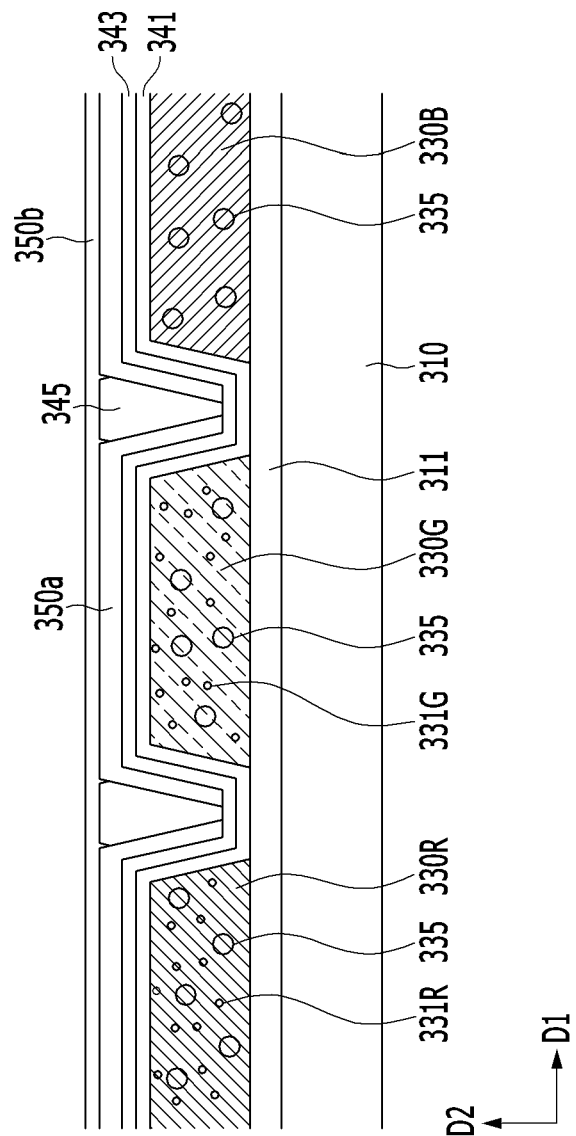

As shown in FIG. 8, an auxiliary layer 350b is formed on the light blocking member 345 and the first metal pattern 350a. The auxiliary layer 350b may include a silicon oxide as one example.

By patterning the auxiliary layer 350b and the first metal pattern 350a, as shown in FIG. 1, a wire grid pattern 351 may be formed. The wire grid pattern 351 may include a plurality of patterns with a line shape having a width of about 100 nm to about 200 nm, and the plurality of patterns may be formed to be periodically disposed at a predetermined interval.

In the step of patterning the first metal pattern 350a, the first metal pattern 350a positioned at the upper surface of the plurality of color conversion layers 330R and 330G and the upper surface of the transmission layer 330B may be patterned, and the first metal pattern 350a overlapping the side of the light blocking member 345, the side of the plurality of color conversion layers 330R and 330G, and the side of the transmission layer 330B may not be patterned. Accordingly, the patterned first metal pattern 350a may be formed as the wire grid pattern 351, and the first metal pattern 350a that is not patterned and overlaps the light blocking member 345 may be formed as the reflection pattern 353. As such, the wire grid pattern 351 positioned at the edge of the plurality of color conversion layers 330R and 330G and the edge of the transmission layer 330B may be connected to the reflection pattern 353.

The patterning step may use any method such as a nano-imprinting method, a photolithography method, and a printing method, but is not limited thereto.

If a fourth passivation layer 360 is formed on the wire grid pattern 351 and the light blocking member 345, the color conversion display panel 30 shown in FIG. 1 may be formed. The fourth passivation layer 360 may include the same material as the above-described auxiliary layer 350b such that the fourth passivation layer 360 and the auxiliary layer 350b may form the same layer.

Figure 9:
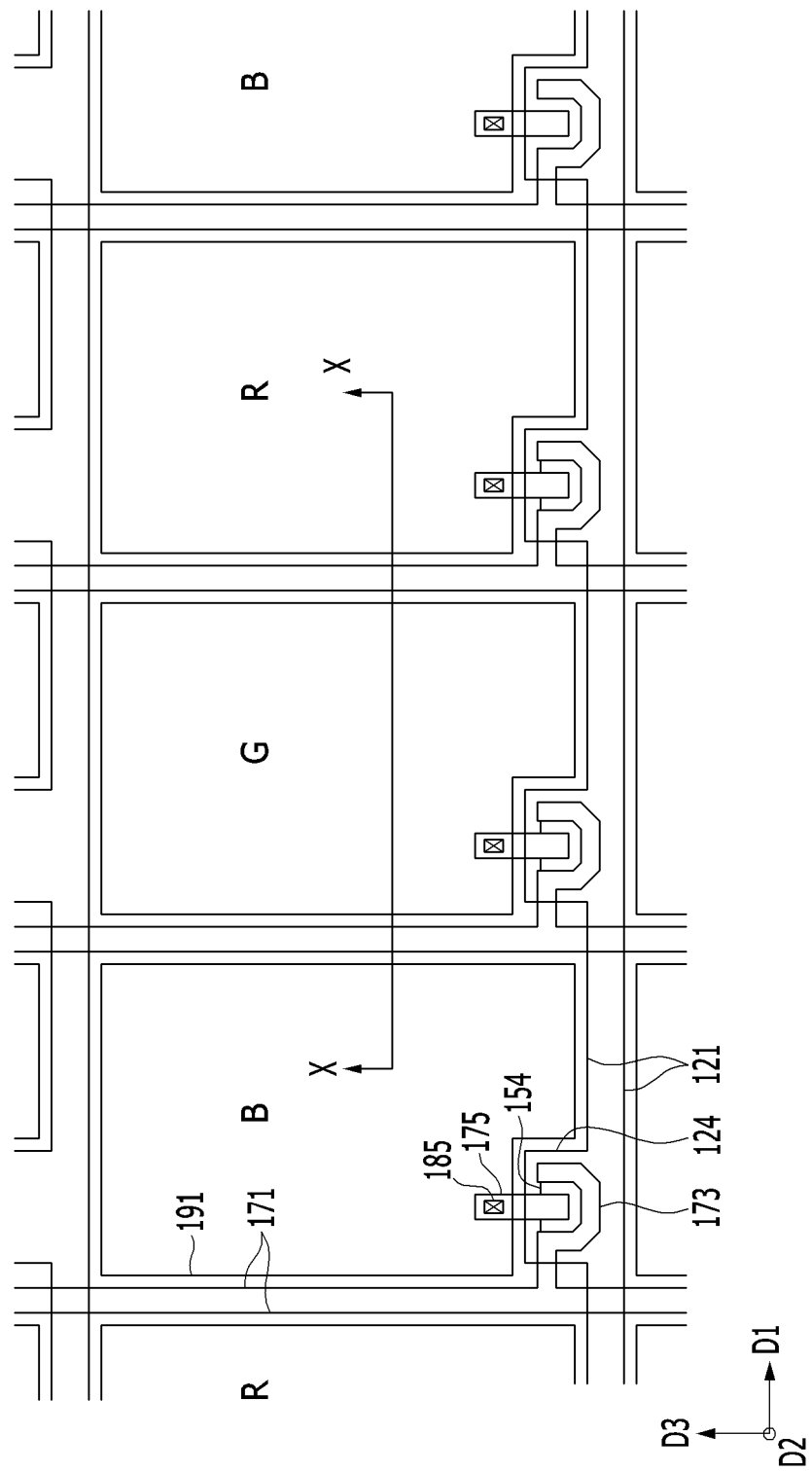
FIG. 9 is a top plan view of a display device including the color conversion display panel of FIG. 1.
Figure 10:
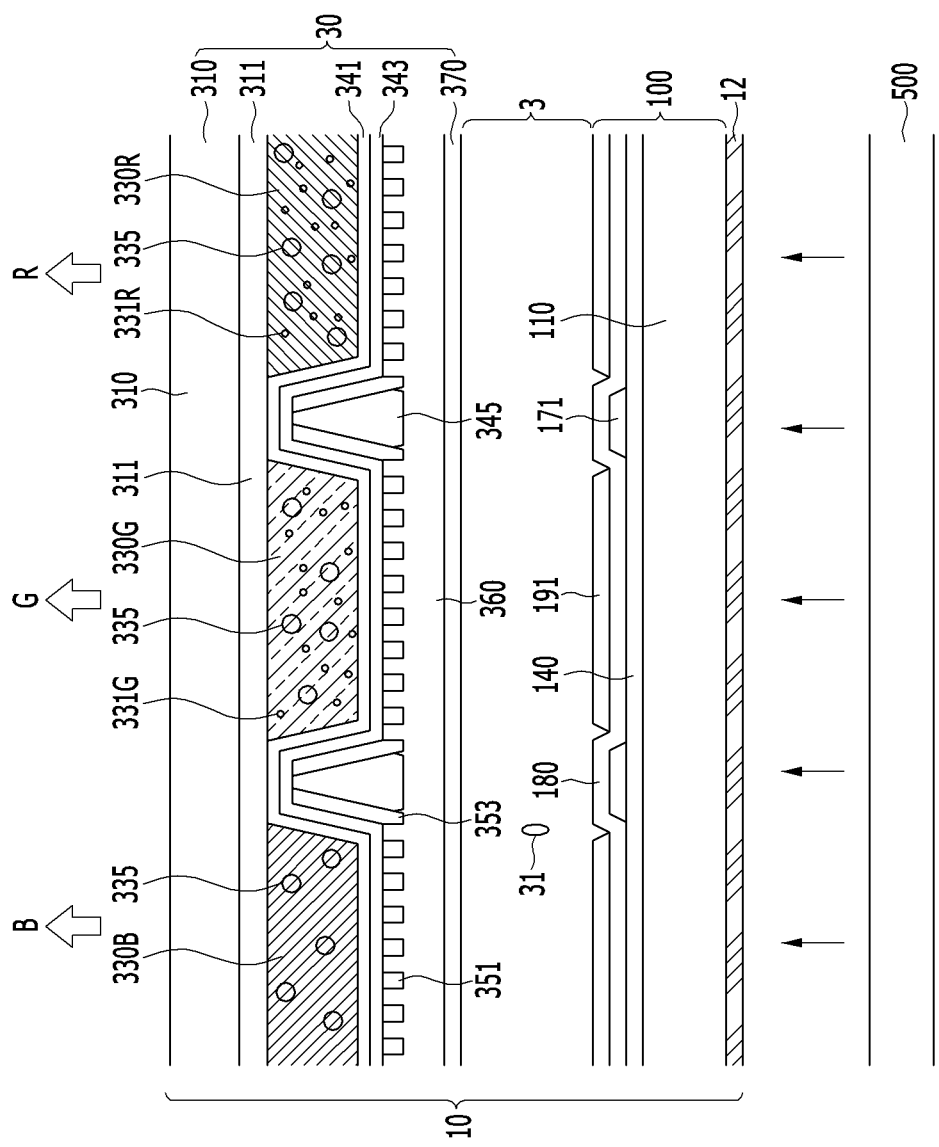
FIG. 10 is a cross-sectional view taken along a line X-X' of FIG. 9.
Figure 11:
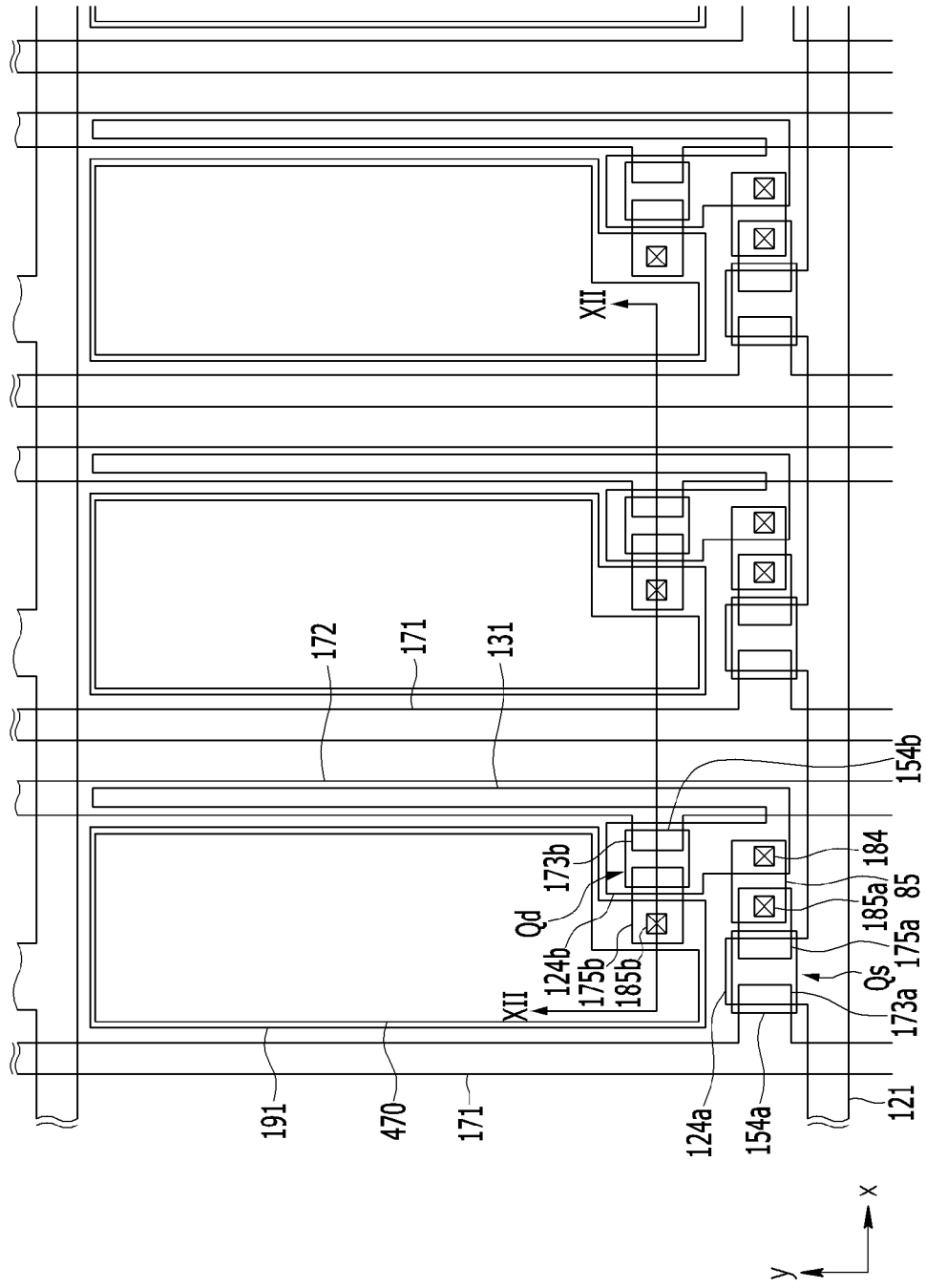
FIG. 11 is a top plan view of a display device including the color conversion display panel of FIG. 1.

The display device including the color conversion display panel according to an exemplary embodiment will be described with reference to FIG. 9, FIG. 10, and FIG. 11. FIG. 9 is a top plan view of a display device including the color conversion display panel of FIG. 1, FIG. 10 is a cross-sectional view taken along a line X-X' of FIG. 9, and FIG. 11 is a top plan view of a display device including the color conversion display panel of FIG. 1. The color conversion display panel described in FIG. 9 to FIG. 11 is the same as the color conversion display panel described in FIG. 1 such that the detailed description thereof is omitted.

Referring to FIG. 9 and FIG. 10, the display device according to an exemplary embodiment includes a display panel 10 and a light unit 500.

The light unit 500 may be positioned at the rear surface of the display panel 10, and may include a light source generating light and a light guide (not shown) receiving the light and guiding the received light in the direction of the display panel 10.

The light unit 500 may include at least one light emitting diode (LED), and may be a blue light emitting diode (LED). The light source of the present exemplary embodiment may be an edge type of light unit disposed on at least one lateral surface of the light guide, or a direct type of light unit in which the light source of the light unit 500 is disposed directly under the light guide (not shown), but is not limited thereto.

The display panel 10 according to an exemplary embodiment includes a lower panel 100, a color conversion display panel 30 facing and overlapping the lower panel 100, and a liquid crystal layer 3 positioned between the lower panel 100 and the color conversion display panel 30 and including a plurality of liquid crystal molecules.

The lower panel 100 may include a first substrate 110, and a plurality of pixels may be positioned in the matrix shape on the first substrate 110.

A gate line 121 extending in a direction D1 and including a gate electrode 124, a gate insulating layer 140 positioned on the gate line 121, a semiconductor layer 154 positioned on the gate insulating layer 140, a data line 171 positioned on the semiconductor layer 154, extending in a direction D3 and including a source electrode 173, a passivation layer 180 positioned on the drain electrode 175, the data line 171, and the drain electrode 175, and a pixel electrode 191 electrically connected to the drain electrode 175 through a contact hole 185 may be positioned on the first substrate 110.

The semiconductor layer 154 positioned on the gate electrode 124 may form a channel layer in a region exposed by the source electrode 173 and the drain electrode 175, and the gate electrode 124, the semiconductor layer 154, the source electrode 173, and the drain electrode 175 may form one thin film transistor.

The color conversion display panel 30 includes the substrate 310 overlapping and separated from the first substrate 110. A first passivation layer 311 is positioned between the substrate 310 and the liquid crystal layer 3.

The red color conversion layer 330R including the red quantum dot 331R, the green color conversion layer 330G including the green quantum dot 331G, and the transmission layer 330B may be positioned between the first passivation layer 311 and the liquid crystal layer 3. At least one among the red color conversion layer 330R, the green color conversion layer 330G, and the transmission layer 330B may include the scattering member 335.

The second passivation layer 341 and the third passivation layer 343 may be sequentially positioned between the red color conversion layer 330R, green color conversion layer 330G, and transmission layer 330B, and the liquid crystal layer 3.

The wire grid pattern 351 and the reflection pattern 353 may be positioned between the third passivation layer 343 and the liquid crystal layer 3. The light blocking member 345 may be positioned between the reflection pattern 353 and the liquid crystal layer 3.

The fourth passivation layer 360 providing the flat surface may be positioned between the wire grid pattern 351 and the liquid crystal layer 3, and a common electrode 370 may be positioned between the fourth passivation layer 360 and the liquid crystal layer 3. The common electrode 370 receiving the common voltage may form an electric field with the pixel electrode 191, thereby controlling the liquid crystal molecules 31 positioned in the liquid crystal layer 3. The liquid crystal layer 3 may include the plurality of liquid crystal molecules 31, and the arrangement direction of the liquid crystal molecules 31 may be controlled by the electric field between the pixel electrode 191 and the common electrode 270. Transmittance of light received from the light unit 500 may be controlled depending on the control of the liquid crystal molecules, thereby displaying the image.

Although not shown in the present specification, an alignment layer positioned between the pixel electrode 191 and the liquid crystal layer 3 and an alignment layer positioned between the common electrode 370 and the liquid crystal layer 3 may be further included.

The display device according to an exemplary embodiment may further include a first polarization layer 12 positioned between the light unit 500 and the first substrate 110, as well as the above-described wire grid pattern 351.

The first polarization layer 12 may be one of a coating type polarization layer or a wire grid polarization layer. The polarization layer 12 may be positioned at one surface of the lower panel 100 by various methods such as a film type, a coating type, and an attaching type. However, this description is only one example, and the present invention is not limited thereto.

Figure 12:
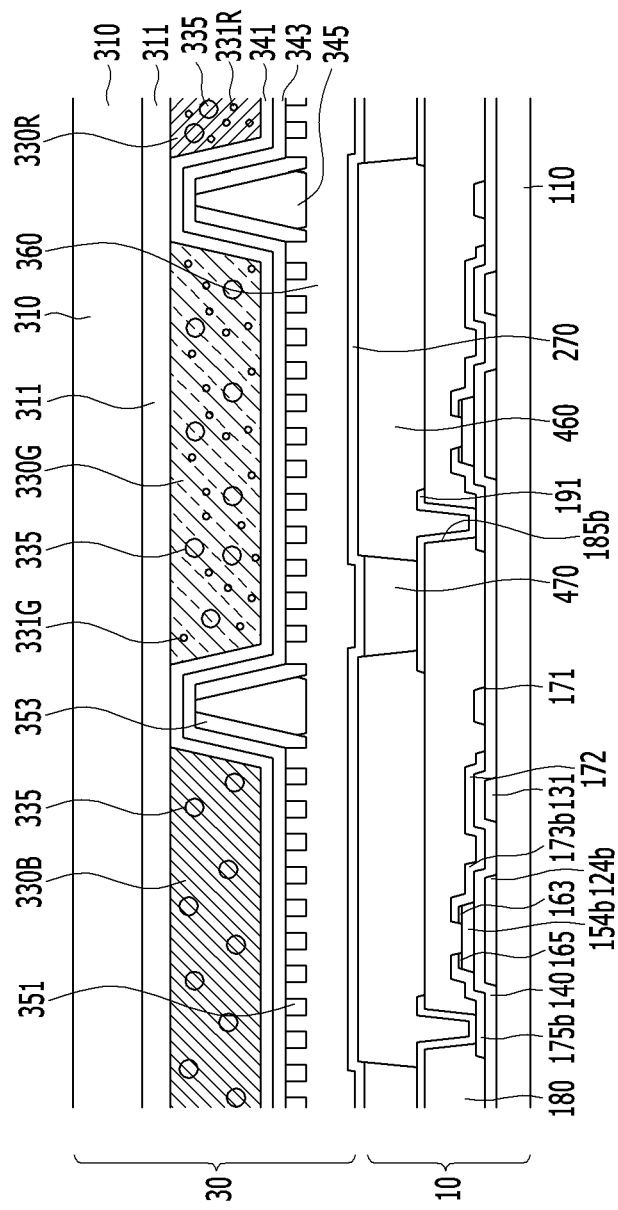
FIG. 12 is a cross-sectional view taken along a line XII-XII' of FIG. 11.

Next, the display device according to an exemplary embodiment will be described with reference to FIG. 11 and FIG. 12. FIG. 11 is a top plan view of a display device including the color conversion display panel of FIG. 1, and FIG. 12 is a cross-sectional view taken along a line XII-XII' of FIG. 11.

The display panel 10 may include a gate conductor positioned on the first substrate 110 which may include a gate line 121 having a first gate electrode 124a and a storage electrode 131 having a second gate electrode 124b.

A gate insulating layer 140 made of a silicon nitride (SiNx) or a silicon oxide (SiOx) may be positioned on the gate conductor (121, 124a, 124b, 127, and 131).

First and second semiconductor layers 154a and 154b including hydrogenated amorphous silicon (amorphous silicon is abbreviated as "a-Si") or a polysilicon may be positioned on the gate insulating layer 140. The first and second semiconductor layers 154a and 154b may be respectively positioned on the first and second gate electrodes 124a and 124b.

A pair of ohmic contacts 163 and 165 may be positioned on each of the first and second semiconductor layers 154a and 154b. The ohmic contacts 163 and 165 may also be omitted.

A data conductor including a data line 171, a driving voltage line 172, and first and second drain electrodes 175a and 175b may be positioned on the ohmic contacts 163 and 165 and the gate insulating layer 140.

The data line 171 may transmit a data signal and extend substantially in a vertical direction, thereby crossing the gate line 121. The data line 171 may include a plurality of first source electrodes 173a extending toward the first gate electrode 124a.

The driving voltage line 172 may transmit a driving voltage and extend substantially in a vertical direction, thereby crossing the gate line 121. The driving voltage line 172 may include a second source electrode 173b extending toward the second gate electrode 124b.

The semiconductor layers 154a and 154b may include a part exposed between the source electrodes 173a and 173b and the drain electrodes 175a and 175b.

A passivation layer 180 may be positioned on the data conductor (171, 172, 173a, 173b, 175a, and 175b) and the exposed part of the semiconductor layers 154a and 154b.

The passivation layer 180 may have contact holes 185a and 185b respectively exposing the first and second drain electrodes 175a and 175b, and the passivation layer 180 and the gate insulating layer 140 may have a contact hole 184 exposing the second gate electrode 124b.

A pixel electrode 191 and a connecting member 85 may be positioned on the passivation layer 180. The pixel electrode 191 may be physically and electrically connected to the second drain electrode 175b through the contact hole 185b, and the connecting member 85 may be connected to the second gate electrode 124b and the first drain electrode 175a through the contact holes 184 and 185a.

A partition wall 460 may be positioned on the passivation layer 180. An emission layer 470 may be positioned in an opening on the pixel electrode 191 defined by the partition wall 460. The emission layer 470 of an emissive display device according to the present exemplary embodiment may be made of a material emitting blue light.

In a general emissive display device, materials uniquely emitting any one light among primary colors such as three primary colors of red, green, and blue may all be included, however in the case of the emissive display device according to the present exemplary embodiment, the color conversion display panel 30 for representing each color of red, green, and blue is positioned at the upper surface of the emissive display device such that only material emitting the blue light may be included.

A common electrode 270 may be positioned on the emission layer 470.

In the emissive display device, the first gate electrode 124a connected to the gate line 121, the first source electrode 173a connected to the data line 171, and the first drain electrode 175a may form a switching thin film transistor (a switching TFT) Qs along with the first semiconductor layer 154a, and the channel of the switching thin film transistor Qs may be formed in the first semiconductor layer 154a between the first source electrode 173a and the first drain electrode 175a. The second gate electrode 124b connected to the first drain electrode 175a, the second source electrode 173b connected to the driving voltage line 172, and the second drain electrode 175b connected to the pixel electrode 191 may form a driving thin film transistor (a driving TFT) Qd along with the second semiconductor layer 154b, and the channel of the driving thin film transistor Qd may be formed in the second semiconductor layer 154b between the second source electrode 173b and the second drain electrode 175b. The pixel electrode 191, the emission layer 470, and the common electrode 270 may form the light emitting diode (LED). The pixel electrode 191 may be an anode and the common electrode 270 may be a cathode, or alternatively, the pixel electrode 191 may be the cathode and the common electrode 270 may be the anode.

This emissive display device may emit the light upward and downward with respect to the first substrate 110 to display the image, and the exemplary embodiment in which the light is emitted upward with respect to the first substrate 110 is described according to an exemplary embodiment of the present invention.

The color conversion display panel 30 may be the same as the color conversion display panel 30 described in FIG. 1 such that the detailed description thereof is omitted.

The color conversion display panel 30 may include the substrate 310 overlapping and separated from the first substrate 110. The first passivation layer 311 may be positioned between the substrate 310 and the display panel 10.

The red color conversion layer 330R including the red quantum dot 331R, the green color conversion layer 330G including the green quantum dot 331G, and the transmission layer 330B may be positioned between the first passivation layer 311 and the display panel 10. At least one among the red color conversion layer 330R, the green color conversion layer 330G, and the transmission layer 330B may include the scattering member 335.

The second passivation layer 341 and the third passivation layer 343 may be sequentially positioned between the red color conversion layer 330R, green color conversion layer 330G, and transmission layer 330B, and the display panel 10.

The wire grid pattern 351 and the reflection pattern 353 may be positioned between the third passivation layer 343 and the display panel 10, and the light blocking member 345 may be positioned between the reflection pattern 353 and the display panel 10.

The fourth passivation layer 360 providing the flat surface may be positioned between the wire grid pattern 351 and the display panel 10.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A color conversion display panel, comprising:
a transmission layer disposed on a substrate;
a color conversion layer disposed on the substrate and comprising at least one of a quantum dot and a phosphor;
a wire grid pattern disposed on the color conversion layer and the transmission layer; and
a reflection pattern connected to a part of the wire grid pattern and disposed between the color conversion layer and the transmission layer disposed adjacent to the color conversion layer.

2. The color conversion display panel of claim 1, wherein the reflection pattern overlaps a side surface of the color conversion layer and a side surface of the transmission layer.

3. The color conversion display panel of claim 1, wherein the wire grid pattern overlaps an upper surface of the color conversion layer and an upper surface of the transmission layer.

4. The color conversion display panel of claim 1, further comprising a light blocking member disposed between the color conversion layer and the transmission layer disposed adjacent to the color conversion layer,
wherein the light blocking member and the wire grid pattern are spaced apart from each other in a plan view.

5. The color conversion display panel of claim 1, wherein the transmission layer comprises a negative type photosensitive resin.

6. The color conversion display panel of claim 1, wherein:
the color conversion layer comprises a red color conversion layer and a green color conversion layer,
the red color conversion layer comprises a red quantum dot,
the green color conversion layer comprises a green quantum dot, and
at least one of the color conversion layer and the transmission layer comprises a scattering member.

7. A display device, comprising:
a lower panel;
a color conversion display panel overlapping the lower panel; and
a liquid crystal layer disposed between the lower panel and the color conversion display panel,
wherein the color conversion display panel comprises:
a substrate overlapping the lower panel,
a color conversion layer and a transmission layer disposed between the substrate and the liquid crystal layer,
a wire grid pattern disposed between the color conversion layer and the liquid crystal layer and disposed between the transmission layer and the liquid crystal layer, and
a reflection pattern connected to a part of the wire grid pattern.

8. The display device of claim 7, wherein the reflection pattern overlaps a side surface of the color conversion layer and a side surface of the transmission layer.

9. The display device of claim 7, wherein the wire grid pattern overlaps a surface of the color conversion layer facing the lower panel and a surface of the transmission layer facing the lower panel.

10. The display device of claim 7, further comprising a light blocking member disposed between the color conversion layer and the transmission layer disposed adjacent to the color conversion layer,
wherein the light blocking member and the wire grid pattern are spaced apart from each other in a plan view.

11. The display device of claim 7, wherein the transmission layer comprises a negative type photosensitive resin.

12. The display device of claim 7, wherein:
the color conversion layer comprises a red color conversion layer and a green color conversion layer,
the red color conversion layer comprises a red quantum dot,
the green color conversion layer comprises a green quantum dot, and
at least one of the color conversion layer and the transmission layer comprises a scattering member.

13. The display device of claim 7, wherein
the lower panel comprises:
a first substrate;
a thin film transistor positioned on the first substrate; and
a pixel electrode connected to the thin film transistor, and
the color conversion display panel further comprises a common electrode positioned between the wire grid pattern and the liquid crystal layer.

14. A display device, comprising:
a display panel; and
a color conversion display panel overlapping the display panel,
wherein the color conversion display panel comprises
a substrate overlapping the display panel,
a color conversion layer and a transmission layer disposed between the substrate and the display panel,
a wire grid pattern disposed between the color conversion layer and the display panel and disposed between the transmission layer and the display panel, and
a reflection pattern connected to a part of the wire grid pattern.

15. The display device of claim 14, wherein:
the reflection pattern overlaps a side surface of the color conversion layer and a side surface of the transmission layer, and
the wire grid pattern overlaps a surface of the color conversion layer facing the display panel and a surface of the transmission layer facing the display panel.

* * * * *